Patented Oct. 16, 1923.

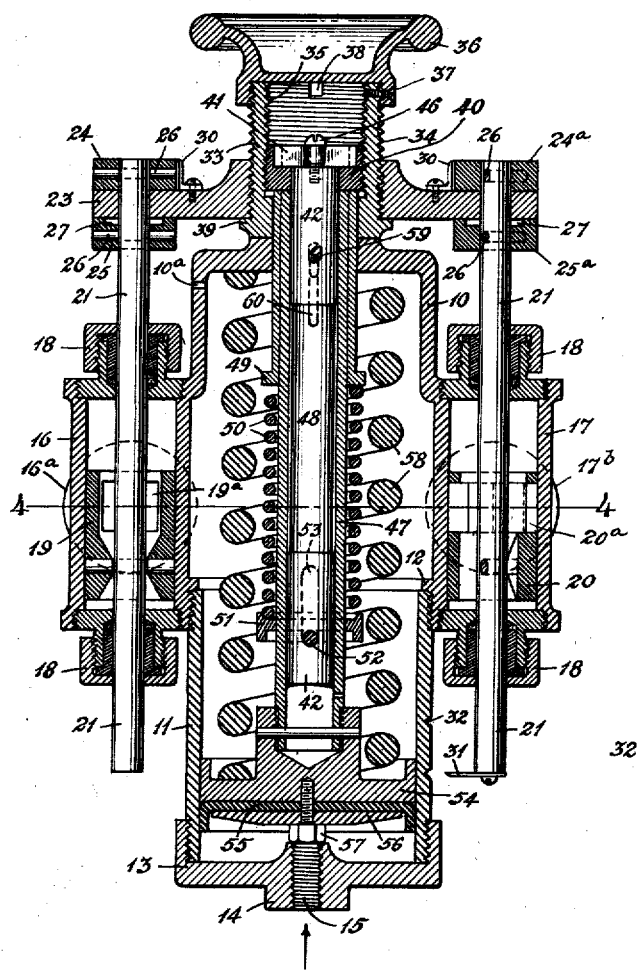

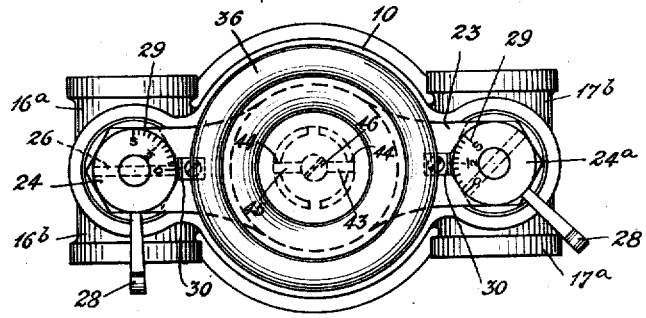
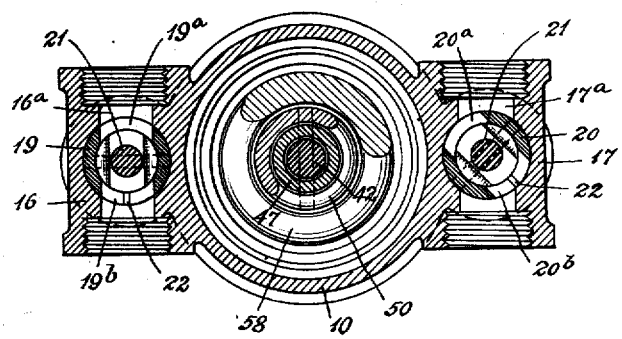
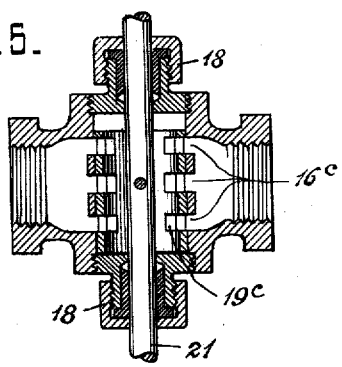
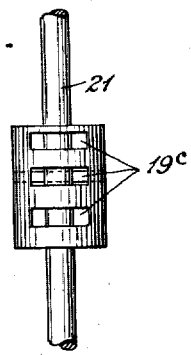

1,470,971

UNITED STATES PATENT OFFICE.

ERNEST GROSSENBACHER, OF FAJARDO, PORTO RICO.

AUTOMATIC REGULATOR.

Application filed October 19, 1920. Serial No. 418,119.

*To all whom it may concern:*

Be it known that I, ERNEST GROSSEN-BACHER, a citizen of the United States, and resident of Fajardo, Porto Rico, have invented certain new and useful Improvements in Automatic Regulators, of which the following is a specification.

My invention relates to regulators and has for its object to provide a simple and efficient apparatus whereby the admixture of certain predetermined media may be automatically controlled and whereby the proportions of the admixture may be automatically maintained at a relatively constant point. A further object of my invention is to construct the regulator in such a manner that it may be readily adjusted to automatically provide any variety of admixtures which may be desired. The invention will be fully described hereinafter and the features of novelty will be pointed out in the appended claims.

It will be understood that the regulator may be used for controlling the admixture of a plurality of gaseous media, a plurality of liquid media, gaseous and liquid media, liquefied solids with any other medium, gasified liquids with any other medium, liquefied gases with any other medium, and in short may be utilized in connection with the admixture of any number and character of media in the predetermined proportion regardless of the quantity or volume. Thus in practice, the apparatus is, for instance, adaptable to the admixture of paints or chemicals or for maintaining the correct mixture of the welding gas in oxy-acetylene welding apparatus or it may be utilized in connection with oil burning furnaces for automatically regulating the proportions of fuel and atomizing agent for which the invention is admirably adapted. For the purposes of illustration and description and without intending to define the limits of the invention, the latter is shown, in the accompanying drawings and described in the specification, as used in connection with an oil burner; in said drawings, Fig. 1 is a sectional elevation; Fig. 2 is a side elevation; Fig. 3 is a plan view; Fig. 4 is a horizontal section on the line 4—4 of Fig. 1; and Figs. 5 and 6 are detail views illustrating another form of my invention.

In the illustrated example, the regulator comprises a main body 10 of suitable form and construction and provided at its upper end with an axial bore for the accommodation of a piston rod hereinafter referred to, said body at its lower end being internally screwthreaded for the reception of a cylinder 11. In the preferred construction, the latter is screwed tightly against an internal annular shoulder 12 formed on the body 10 and is externally screwthreaded at its lower end to receive the cylinder cover 13 which is constructed with a hub 14 having an internally screwthreaded axial bore 15 in which one end of a suitable pressure pipe whereby the regulator is connected, for instance, with a boiler, is secured. The hub 14, in the illustrated example, projects inwardly beyond the inner surface of the cover and has its external portion preferably of polygonal shape for the accommodation of a wrench or other tool whereby the manipulation of the cover 13 is facilitated.

The regulator includes further a plurality of valve casings, preferably comprising integral parts of the body 10, the illustration showing two casings 16 and 17 located at diametrically opposite points exteriorly of said body and having no communication with the interior thereof. These casings 16 and 17 are in the form of straight bored cylinders, the axes of which are parallel to the axis of the body 10, said casings being threaded at both ends to receive the stuffing boxes 18 which may be of any well known construction and preferably are of a deep type so as to secure tightness without undue pressure upon the packing. In some instances, the casings 16 and 17 may be provided with a stuffing box at one end only as in cases where the pressure of the medium on the valve stem does not affect the operation of the valve. The casings 16 and 17 are further provided with port openings 16ª and 16ᵇ and 17ª and 17ᵇ respectively, the openings 16ª and 17ª being connected with the oil burner, while the openings 16ᵇ and 17ᵇ are in communication respectively with a source of liquid fuel such as oil and an atomizing agent such as steam. The port openings at their inner end portions are shaped and dimensioned in a predetermined manner in accordance with the particular purpose for which the regulator, in each case, is intended and the proportioning of the medium which is to pass through each valve casing and in the illustrated example are of rectangular form.

Each casing 16 and 17 contains a valve 19 and 20 respectively, which valves are carried by valve stems 21 either as integral parts thereof or as separate elements suitably connected with said stems, the valves being capable of being moved both lengthwise and rotatably in said casings as will be more fully pointed out hereinafter. The valves 19 and 20 are cylindrical and hollow and preferably are split lengthwise as indicated at 22 to permit of expansion and contraction under temperature changes; in order to maintain a tight fit of the valves in the casings said valves themselves may possess an inherent outward elasticity or any suitable means may be combined with said valves which tend to spread them apart at the split for bringing about the same result. Port openings 19$^a$ and 19$^b$ and 20$^a$ and 20$^b$ are formed in the walls of the valves at appropriate points and co-operate with the ports 16$^a$, 16$^b$, 17$^a$ and 17$^b$ as will appear more fully hereinafter, the valve ports being also of a shape and of dimensions predetermined by the medium which is to pass through said valves. The valve stems 21 may, as shown, comprise straight cylindrical rods which in the illustrated example project through and beyond the stuffing boxes 18 at each end of the casings 16 and 17 and at their upper ends extend through a yoke 23 with which said stems are connected by means of devices 24 and 24$^a$ in surface engagement with the upper face of said yoke and retainers 25 and 25$^a$ in surface engagement with the lower face of said yoke. The devices and retainers are preferably in the form of annular members and may be fastened to the stems 20 in any convenient manner as by means of taper pins 26, the arrangement being such that the devices and retainers in conjunction with the stems 21 are rotatable about their axes relatively to the yoke 23 whereby the valves 19 and 20 are similarly actuated relatively to their respective casings for adjustment purposes, as will be more fully pointed out further on in the description. The retainers 25 and 25$^a$ are recessed for the accommodation of spring washers 27 which by bearing against the opposed surfaces of the yoke 23 and retainers 25 and 25$^a$ maintain the parts against unintentional actuation. In order to facilitate the rotative manipulation of the valves 19 and 20 the devices 24 and 24$^a$ may be provided with handles 28 and in addition, said devices may have suitable graduations 29 produced, for instance, upon their upper surfaces for cooperation with suitable pointers 30 fixed upon the yoke 23 whereby the adjustments of said valves 18 and 19 are visibly indicated. Similarly for indicating the vertical adjustments of said valves, one or both stems 21 may be provided at their lower ends with an indicator 31 of suitable form arranged for cooperation with designations 32 of any desired type indicative of the positions of said valves and produced for instance, upon the cylinder 11.

The regulator includes further a control bushing 33 preferably in the form of a cup-shaped body having an axial bore located in registry with the previously mentioned axial bore of the body 10, said bushing being further provided with external threads 34 and internal threads 35 of the same pitch. The one end of the bushing 33 bears against the outer end of the main body 10 and at its opposite end carries a hand wheel 36 which is detachably fastened thereto in any convenient manner as by means of one or more screws 37 and one or more lugs 38 fitting into co-operating recesses on said bushing; the hand wheel 36 which constitutes a means whereby the bushing 33 is rotatably actuated also comprises a cover therefor as is clearly shown in Fig. 1. The bushing 33, through the medium of the external screwthreads 34, is in screwthreaded engagement with the yoke 23, the outward movement of which, relatively to said bushing, is arrested by the hand wheel 36, while its inward relative movement is limited by an annular shoulder 39 formed on the bushing 33 as illustrated in Fig. 1.

A regulating nut 40 is located within the bushing 33 in screwthreaded engagement with the internal threads 35 thereof and is recessed for the reception of the head 41 of a retaining rod 42, which in practice, as will be more fully pointed out hereinafter, is required at times, to be fixed relatively to said regulating nut and at other times said nut is required to be rotatable relatively to said rod 42. Any suitable arrangement may be provided for attaining these results; for instance, as shown, a cut 43 may extend diametrically across the head 41 in registry with diametrically opposite cuts 44 in the nut 40 for the accommodation of a key 45 which itself is removably fastened in place by means of a screw 46. The retaining rod 42 extends into a hollow piston rod 47 located within the body 10 and projecting through registering axial bores of the body and of the control bushing 33 as shown in Fig. 1; in order to reduce friction to a minimum, the intermediate portion of said rod 42 may be undercut or reduced in diameter as indicated at 48. The hollow piston rod 47 is provided with an annular shoulder 49 which may comprise an integral part of said rod or which may be formed by shrinking a suitable bushing upon said rod in which case the outer end portion of the latter may be of relatively increased diameter as shown in the illustrated example.

In any case, the shoulder 49 constitutes an abutment for one end of a retaining spring 50, the other end of which rests against a cup 51 fitting loosely on the piston rod 47 in engagement with a pin 52 which extends transversely through the retaining rod 42 and through diametrically opposite slots 53 formed in the piston rod 47 and extending lengthwise thereof as shown in Fig. 1. In the preferred arrangement the cup 51 is formed with an upper peripheral flange, which provides a seat for the spring 50 and with a lower peripheral flange which prevents the pin 52 from shifting materially in the direction of its length relatively to said rod 42.

The inner end of the piston rod 47 is connected with a piston 54 of suitable construction which fits the interior of the cylinder 11 and which in the illustrated example includes a cup leather 55 held in place by means of a washer 56 and a bolt 57; in the normal or relieved position of the piston 54, the head of the bolt 57 engages the hub 14 of the cylinder cover 13. A pressure spring 58 surrounds the piston rod 47 and with its one end bears against the upper end of the body 10 and with its other end engages the piston 54, said spring being constructed to carry the load of the boiler pressure exerted by said piston and being considerably heavier than the previously mentioned retaining spring 50. The latter is of sufficient strength to overcome the friction between the stuffing boxes 18 and valve stems 21 as well as the friction between the valves 19 and 20 and their respective casings 16 and 17 and also the friction between the retaining rod 42 and the piston rod 47 and always tends to maintain the control bushing 33 in its lowest position relatively to the body 10 or the piston rod 47.

The body 10 is drilled and tapped at an appropriate point for the accommodation of a set screw 59 which projects into a key way 60 formed in the piston rod 47 and thereby prevents rotation of the latter relatively to the body 10 without interfering with the lengthwise movement of said piston rod; through the medium of the pin 52 which connects the piston rod and the retaining rod 42 said set screw 59 also maintains the latter against rotative movement about its axis and thus holds the regulating nut 40 against rotation with the control bushing 33 when the latter is manually actuated to adjust the valves 19 and 20.

In describing the operation of the regulator it will be assumed that the same is being used in conjunction with an oil burner, this, it being understood, being only an example selected for the purposes of description and illustration. In such case the regulator is preferably located as close as possible to the burner, the cylinder 11 being connected at the port 15 with the boiler and the ports 16$^b$ and 17$^b$ being connected respectively with a source of fuel supply and with an atomizing agent such as steam, while the ports 16$^a$ and 17$^a$ are both in communication with the burner which may be of any existing and well-known type.

The regulator is adjusted by first turning the hand wheel 36 to rotate the control bushing 33 in a direction to cause the yoke 23, by the action of the screwthreads 34, to climb up on said bushing, the actuation being continued until the yoke 23 engages the lower end of said hand wheel 33. The described operation of the latter and the bushing 36, through the medium of the screwthreads 35, also causes the regulating nut 40 to rise in said bushing and consequently to withdraw the retaining rod 42 somewhat from the piston rod 47 against the tension of the spring 50, this operation causing no movement of the piston 54 because of the resistance offered by the pressure spring 58. As the yoke 23 climbs up on the bushing 33, the valve stems 21 and with them the valves 19 and 20 are correspondingly raised so that when said yoke finally abuts against the hand wheel, said valves will be in their closed positions. At this stage or previously, the devices 24 and 24$^a$ are rotatably adjusted until the designations 0 of the scales 29 register with the indicators 30 in which position the ports 19$^a$ and 19$^b$ of the valve 19 are in registry with the ports 16$^a$ and 16$^b$ respectively, while the ports 20$^a$ and 20$^b$ of the valve 20 are in alinement respectively with the ports 17$^a$ and 17$^b$. As the next step, the oil and steam valves, with which the two lines from the ports 16$^b$ and 17$^b$ should preferably be equipped, are opened, thus putting the regulator into service.

The hand wheel 36 is now slowly turned in the reverse direction to cause the yoke 23 to descend on the bushing 33 which causes a downward movement of the valve stems 21 and valves 19 and 20 the latter being thus gradually opened up. This operation of the hand wheel 36 is continued until steam and oil begin to escape from the burner which is then ignited; after a sufficient amount of oil escapes the steam should be regulated by rotating the device 24$^a$ slightly which causes a corresponding rotative movement of the valve 20 and thus moves the ports 20$^a$ and 20$^b$ somewhat relatively to the ports 17$^a$ and 17$^b$ or in other words, slightly closes said valve and thereby adjusts the flow of steam as may be required. Additional adjustment of said valve 20 and similar adjustment of the oil valve 19 may be made by rotatably shifting the devices 24 and 24$^a$ by means of the handles 28 until the combustion at the burner is perfect. After this has been done the hand wheel 36 may be again actuated to cause the yoke 23 to descend further on the control bushing 33 and to open the valves 19 and 20 until the flame at the burner is of sufficient strength or intensity. If changes in the viscosity of the oil due for instance, to changes in the oil temperature take place, proper adjustments of the valves 19 and 20 to compensate for the change may be made through the medium of the devices 24 and 24ª in the manner previously described; any changes in the flame due to atmospheric conditions such as change of atmospheric temperature may similarly be corrected by properly adjusting the valves 19 and 20 by means of said quadrants.

If steam from the boiler is now admitted through the port 15 to the cylinder 11, the pressure of said steam will raise the piston 54 against the tension of the pressure spring 58 and will correspondingly move the piston rod 47 relatively to the retaining rod 42. If the pressure increases sufficiently, the described movement of the parts will cause the end of the piston rod 47 to engage and exert a push against the regulating nut 41, thus raising the control bushing 33 from its seat on the body 10 and carrying with it the stems 21 and valves 19 and 20, which, as a result, are closed to such a degree that just enough fuel and atomizing agent will reach the burner to maintain the boiler pressure for which the apparatus is set. An air hole 10ª is preferably drilled in the casing 10 at any suitable point to permit the air to escape when the spring 58 is compressed.

The regulator is next set for automatic control by first removing the hand wheel 36 from the control bushing 33 which may be readily accomplished by simply taking out the screws 37 and which exposes the interior of said bushing: the screw 46 and the key 45 are then successively removed, which leaves the regulating nut 40 free to rotate relatively to the retaining rod 42. By means of a suitable socket wrench or other tool which may now be inserted into the bushing 33, the regulating nut 40 is rotated relatively to said bushing 33, which preferably is manually held in position against turning, and which, by the action of said nut 40 is caused to move away from the body 10. This movement is communicated by the stems 21 to the valves 19 and 20 and is continued until the latter are closed sufficiently to reduce the flame at the burner enough to maintain the boiler pressure without causing the customary safety valve to blow off. After this pressure adjustment has been made, the key 45 and screw 46 are replaced to again fix the regulating nut 41 on the retaining rod 42 and the hand wheel 36 is again fastened upon the control bushing 33 by the screws 37. It will be understood that by screwing the regulating nut 40 up, a higher pressure will be obtained and that a lower pressure will result from a downward adjustment of said nut.

If the boiler pressure drops, the pressure spring 58 counteracting said boiler pressure will move the piston 54 downwardly and lower the end of the piston rod 47 relatively to the regulating nut 40, thus permitting the control bushing 33 and yoke 23 to drop whereby the valves 19 and 20 are opened to increase the supply of fuel and atomizing agent until equilibrium again exists between the boiler pressure and fuel consumption. This automatic control continues as long as the regulator is in operation and is accurate and efficient and always definitely in accord with the degree of boiler pressure which it is desired to maintain.

Should the boiler pressure, for any reason, drop swiftly and thus cause the regulator to open the valves 19 and 20 considerably in order to regain equilibrium, the flame at the burner might suddenly increase to such a degree as to become harmful to the contiguous parts of the furnace. This contingency may subsequently be avoided by relieving the cylinder 11 of steam pressure and then turning the hand wheel 36 to adjust the valves 19 and 20 until the flame in the furnace is of such strength as is deemed safe for continuous operation under extreme conditions. A mark to indicate the valve adjustment at this stage may then be made upon the cylinder 11 in registry with the indicator 31 after which steam pressure may again be admitted to said cylinder and the automatic operation of the regulator thus continued. The mark referred to may thereafter be utilized to set the maximum opening of the valves 19 and 20 each time after the boiler has been steamed up and before it is put into service; the boiler should not be steamed up with the valves opened to this mark as in such case the resulting flame would be too strong for the relatively cool furnace and boiler.

It will be noted, when the regulator works automatically, that the retaining spring 50 is at rest and simply moves up and down with the piston 54 and piston rod 47 while during such times as the regulator is manually operated through the medium of the hand wheel 36, said spring 50 will be compressed or extended between the shoulder 49 and cup 51 as the latter is caused to move lengthwise of the piston rod 47 by means of the pin 52 and retaining rod 42. As the said retaining spring 50 is of less strength than the pressure spring 58, the former may be compressed to a considerable extent between the shoulder 49 and cup 51 without causing any movement of the piston and piston rod by reason of pressure exerted by said spring 50 against said shoulder 49.

It will be further noted that in adjusting the valves 19 and 20 by means of the hand wheel 36, the yoke 23 is screwed up and down on the control bushing 33, which movements are communicated to said valves through the medium of the stems 21. At the same time, the regulating nut 40 which is prevented from turning with the control bushing by the screw 59 and keyway 60 in the piston rod 47, is actuated concurrently and in unison with said yoke and its connected parts. As the inside thread 35 and outside thread 34 are both identical in pitch, the yoke 23 and regulating nut 40, once the latter has been adjusted for pressure as previously described, will always bear the same relation to each other as is clearly shown in Fig. 1.

Instead of having the valves 19 and 20 constructed as in Figs. 1 to 4 inclusive, the same may be of the form shown in Figs. 5 and 6, in which said valves are provided with a plurality of ports 19ᶜ, all of which communicate with the interior of the valve and which are capable of being all brought into registry with a plurality of similar ports 16ᶜ with which the valve casings in this form are provided, or successively moved into and out of registry therewith by means of the mechanism described with respect to the valves 19 and 20. The ports 19ᶜ may also be of dimensions and form predetermined by the mediums which are intended to pass through the valves equipped therewith, which require only relatively slight movements in vertical directions to fully open or close the same or to adjust said valves to any intermediate positions. The automatic action of the regulator is thus rendered extremely sensitive.

The valves 19 and 20 whether constructed as in Figs. 1 to 4 inclusive or as in Figs. 5 and 6 may be termed dual motion valves and may be utilized in combination with any suitable type of mechanism. The valves may be operated mechanically or automatically entirely, or entirely by manual actuation or one motion of said valves may be automatic while the other is manual and vice versa or all motions of said valves may be partly automatic and partly manual, as may be desired.

Any variety of areas of openings may be secured by adjusting the valve in both motions possible or in one and not in the other, etc.; the rotative adjustments of the valve may be indicated by a graduated device as shown, the designations being degrees of a circle or representing units of the port openings and the adjustments in directions parallel with the axes of said valve may also, as shown, be indicated by suitable designations, so that the relative positions of the valves are always readily ascertainable. If the designations indicating the adjustments in both directions of motion are representative of inches, then the areas of the port openings may be read, at all times, in square inches, by means of which the quantity of the medium passing through the valve may be measured accurately, if the pressure under which the medium travels, is known. These are some of the advantages of the valve when used either single or double.

When used in multiple, the valves have the additional advantage that a plurality of them may be concurrently operated throughout the movements in one direction while being individually adjustable in this direction and also in the other direction of motion of which said valves are capable.

The regulator is simple in construction and efficient in operation and may be utilized in any case where regulation of a medium is desired or where an admixture of media in predetermined, constant or varying proportions is desired to be delivered and maintained at a given point.

Various changes in the forms shown and described may be made within the scope of the claims without departing from the spirit of my invention.

I claim:

1. A regulator comprising a body having a plurality of inlets and a plurality of cooperating outlets, valves controlling said inlets and outlets, said valves being movable in axial directions and being also rotatable about their axes, actuating mechanism for operating said valves in axial directions and including means whereby the initial positions of said valves relatively to said inlets and outlets is varied and means whereby said valves are rotatably adjusted to vary the effective areas of said inlets and outlets.

2. A regulator comprising a body having a plurality of inlets and a plurality of cooperating outlets, valves controlling said inlets and outlets, said valves being movable in axial directions and being also rotatable about their axes, means for concurrently adjusting all of said valves in axial directions whereby the initial positions of said valves relatively to said inlets and outlets is varied, actuating means for operating said valves in axial directions and adjusting devices rigidly connected with said valves and frictionally connected with said actuating means whereby said valves are rotatably adjusted to vary the effective areas of said inlets and outlets.

3. A regulator comprising a body having inlets and outlets arranged in co-operating pairs, valves movable in axial directions to control said inlets and outlets, and being rotatable to vary the effective area of said inlets and outlets, an adjustable device bearing a fixed relation to said valves, means whereby the initial positions of said valves and said device are concurrently varied without disturbing said fixed relation, adjusting devices whereby said valves are independently rotatable to vary the effective area of said inlets and outlets and actuating means co-operating with said adjustable device to operate said valves.

4. A regulator comprising a body, a plurality of valve casings carried by said body and having inlets and outlets, valves movable lengthwise of said casings to control said inlets and outlets, a yoke connected with said valves, a control-bushing whereby said yoke is adjusted to vary the initial positions of said valves and means within said body whereby said control-bushing and yoke are actuated to concurrently operate said valves.

5. A regulator comprising a body, a plurality of valve casings carried by said body and having inlets and outlets, valves movable lengthwise of said casings to control said inlets and outlets, and rotatable in said casings to vary the effective area of said inlets and outlets, a yoke connected with said valves, an adjustable abutment having a fixed relation to said valves, a control-bushing whereby said yoke and abutment are concurrent to vary the initial positions of said valves and abutment without disturbing said fixed relation, a piston within said body, a piston rod carried thereby and arranged to engage said abutment as said piston is actuated whereby said control-bushing and yoke are actuated to concurrently operate said valves and means frictionally engaging said yoke whereby said valves are rotatably adjusted.

6. A regulator comprising a body, a plurality of valve casings carried by said body and having inlets and outlets of predetermined shape and dimensions, valves in said casings having port openings of predetermined shape and dimensions co-operating with said inlets and outlets, said valves being movable lengthwise of said casings to control said inlets and outlets and rotatable therein to vary the effective area of said inlets and outlets, a yoke, quadrants and quadrant retainers rigidly connected with said valves whereby the latter are rotatably connected with said yoke, handles for actuating said quadrants to rotate said valves, a cup-shaped control-bushing operatively connected with said yoke, a regulating nut within said bushing and operatively connected therewith in predetermined fixed relation to said valves, a hand wheel for rotating said bushing to concurrently adjust the initial positions of said valves and said regulating nut without disturbing said fixed relation, a retaining rod connected with said regulating nut and extending into said body, a piston rod slidably mounted on said retaining rod and arranged to engage said regulating nut whereby said control-bushing and yoke are actuated to concurrently operate said valves, a piston in said body connected with piston rod to operate the same and a spring whereby said piston is returned to normal position.

In testimony whereof I have hereunto set my hand.

ERNEST GROSSENBACHER.